US United States Patent Office 2,757,758
Patented Aug. 7, 1956

2,757,758

CONTROL SYSTEMS FOR ELECTRIC LIFTS AND THE LIKE

Selchouk Ahmed Ghalib, Sale, and Norman Arthur Taylor, London, England, assignors to Metropolitan-Vickers Electrical Company Limited, London, and G. K. Jensen & Company Limited, London, England, both British companies Application April 10, 1953, Serial No. 347,874

Claims priority, application Great Britain April 18, 1952

14 Claims. (Cl. 187—29)

The invention relates to control systems for lifts and the like. The invention has for its object to provide advantageous control systems for lifts of the high-speed passenger type but it will be understood that the invention is applicable also to other forms of lift, conveyor, hoist or other apparatus moving between predetermined stages and in which the operating characteristics provided by the invention are desired. For convenience the term "lift" and "lift cage" will hereinafter be employed to denote all such apparatus and the movable load carried thereby.

For high-speed passenger lifts it is desired to operate with the maximum rate of acceleration and retardation, consistent with comfort of the passengers, so as to obtain the minimum time between stages and to level the cage at decking levels as rapidly as possible. For the latter purpose it is necessary to stabilise the speed at a suitable value for decking.

High-speed passenger lifts are, accordingly to the present general practice, driven by equipment of the type comprising a direct current motor forming part of a Ward-Leonard system, with final stopping of the cage at decking levels controlled by a brake; the generator is overcompounded to provide a rising speed/load characteristic of the motor whereby sufficiently accurate stopping at decking levels is obtained. The inherent limitations of the Ward-Leonard system entail a decking speed which is a comparatively high proportion of the normal value, a value of one-quarter to one-eighth of the running speed being common. As a result of this characteristic, the decking speed commonly increases by from 50% to 100% no-load to full-load, since it is necessary to present the brake drum to the brake when the motor has such a speed that the cage will come to rest in the same position irrespectively of the load. Furthermore the overcompounding of the generator involves a danger of instability in the motor and generator.

According to the present invention, a control system for an electrically-driven lift of the high-speed passenger type (or for other apparatus as above indicated) comprises, in combination with a variable speed electric motor equipment of Ward-Leonard or any other D. C. or A. C. types, speed control means including amplifying means differentially responsive to the actual speed of the lift and to a reference quantity derived from means coupled with the lift so as to vary said reference quantity in accordance with the position of the cage and therefore in accordance with the required speed during the range of movement of the cage. This arrangement provides for accurate control of the speed of the lift to a controlled speed which is dependent upon the position of the cage and is independent of variations of load. The speed control means are such that at positions at which the cage is or may be required to stop, the reference quantity is reduced by the means responsive to the position of the cage to a value such that the speed is reduced to a small proportion of the normal speed thereof, for example one-twentieth to one-fiftieth of the running speed.

The amplifier may be of various types, for example an electronic amplifier or a metadyne or amplidyne or other rotary device, or a magnetic amplifier.

Preferably the control system includes means responsive to the position of the cage for applying braking to the latter when the latter reaches the desking positions and by the control of the so-called decking speed to a low value, which is obtained in dependence on the approach of the cage to a stopping point irrespectively of variations of load, the cage may be brought to rest without appreciable interval after the application of the brake so that variations in the decking position are negligible in spite of large variations in the load.

In carrying out the invention, the reference quantity will normally be reduced to a low value, corresponding with the required decking speed of the lift, over a small range of cage movement. Consequently, the lift would also start at this speed and would not immediately follow the maximum acceleration desired. According to a further feature of the invention, therefore, the arrangement includes means for applying an independent reference quantity for starting the movement of the cage from the decking levels in response to operation of the manual or automatic control means employed for the lift. This independent reference quantity varies in a linear or other predetermined manner with time so that maximum or a desired schedule of acceleration is obtained. Conveniently a resistive/capacitive or other time delay circuit may be employed for this purpose. The control changes over from said independent reference quantity to that dependent on the position of the cage at some point prior to retardation, and conveniently at some point during the acceleration of the cage.

The invention also comprises a number of subsidiary features as are set forth in the appended claims and specific embodiments of which features are hereinafter described.

Reference will now be made by way of example to the accompanying drawings, in which.

Figure 1:
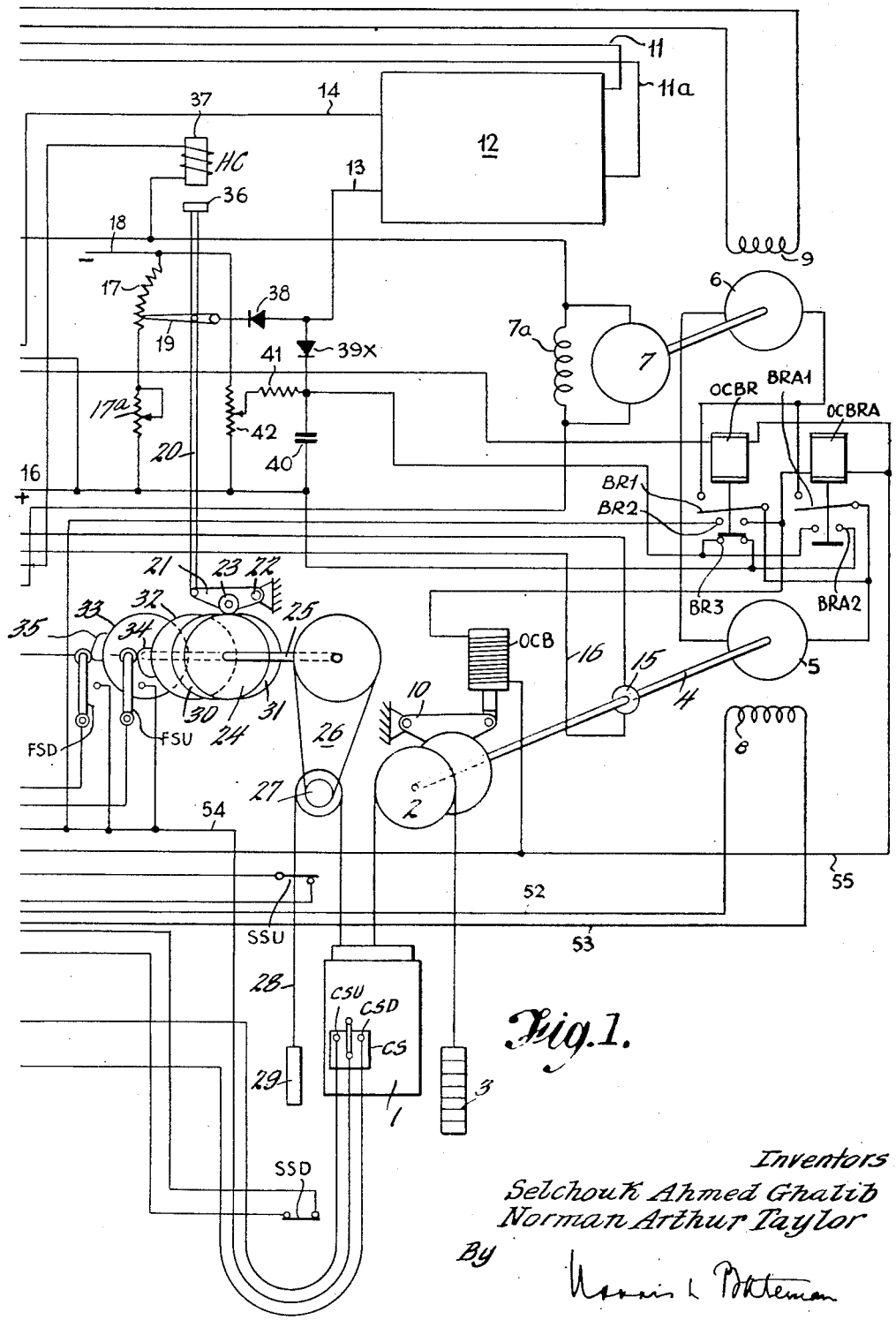
Figs. 1 and 2 are collectively an electrical diagram showing the arrangement of a shaft and control circuits in accordance with one embodiment of the invention.

In Fig. 1 the lift cage or car is shown at 1 and the hoisting sheave or drum at 2 with the usual counterweight at 3. The lift is assumed by way of example to be driven by a direct current motor, the sheave 2 being connected by shaft 4 with the armature 5 of said motor, which armature is connected in a Ward-Leonard circuit with the armature 6 of a generator driven by an electric motor which is shown as a direct current shunt wound motor but may be of any desired direct or alternating current type. A separately excited field winding of the motor 5 is shown at 8 and a separately excited field winding of the generator 6 is shown at 9. The lift is provided with the usual gravity or spring applied brake 10 adapted to be released by a solenoid OCB.

The generator field winding 9 is connected in a manner hereinafter to be described with output conductors 11 and 11a of an amplifier 12 having input conductors 13 and 14. This amplifier may be of any suitable type, but in the embodiment being described is an electronic amplifier and comprises two stages of hard valves followed by a pair of output stages consisting of a pair of thyratron rectifiers connected in a bi-phase full-wave rectification circuit. Such amplifiers are well-known in the art and it is considered unnecessary herein to describe the amplifier in detail.

The input circuit of the amplifier includes the speed control means now to be described. A tachometer generator 15 is coupled with the sheave 2 either directly or by gearing so as to rotate at a speed proportional to the speed of the lift cage. This tachometer generator is connected with the conductor 14 and with a conductor 16 by means of contact U4 and U5 or D4 and D5 as will hereinafter be described. A potentiometer 17 is connected, preferably in series with a preset rheostat 17a between the conductor 16 and a conductor 18, these conductors being supplied from a constant voltage direct current supply, the conductor 16 being positive with respect to the conductor 18. The moving contact 19 of the potentiometer is connected, such as by link 20, with a lever 21 pivoted at 22 and carrying a cam follower roller 23 co-operating with a cam 24. This cam is moved in accordance with the movement of the car, for example may be mounted on a shaft 25 coupled, conveniently through a chain and sprocket or other reduction gear 26, with a shaft 27 over which runs a piano wire or a steel wire rope 28 secured at one end to the car 1 and carrying at its lower end a counter-weight 29. The shaft 27 will thus be rotated in accordance with the movement of the car 1 so that the angular position of cam 24 is representative of the position of the car in the shaft. The cam 24 is provided with a number of profiles or "dwells," such as 30 and 31, corresponding with the number of floors served by the lift and of an angular extent corresponding respectively with the distances between the different floors. Where the distance between adjacent floors is constant, a single dwell can be employed but in general these distances will be different from one another and in order to accommodate the required number of dwells without recourse to an excessively large diameter cam the latter may be of a helical type as in the construction hereinafter to be described with reference to Figs. 3 and 4.

In addition the shaft 25 carries further cams 32 and 33 for operating floor stop or limit switches FSD and FSU. In the example illustrated dwells of these cams appear at 34 and 35.

It may be stated here that the cam dwells 30 and 31 are arranged so as to provide progressive displacement of the contact 19 of the potentiometer 17 from the illustrated position, where the lift car is aligned with a floor, to its uppermost position and the progressively return movement when the car reaches the next floor. The manner in which the corresponding varying voltage derived from the potentiometer is employed to control the lift speed will hereinafter be described.

The link 20 carries at its upper end a magnetic armature 36 co-operating with a magnet 37 having thereon a winding HC, hereinafter referred to as the holding coil. The arrangement is such that if said coil is energised then when the armature 36 has been brought to its uppermost position the magnet 37 will retain the potentiometer 19 and cam follower lever 21 in their uppermost positions irrespectively of the cam formation, but said coil and magnet are incapable of lifting the link 20.

The moving contact 19 is connected with the conductor 13 of the amplifier, preferably through a blocking rectifier 38 of the dry-plate type for purposes which will hereinafter appear. It may be stated here that the tachometer generator and potentiometer output are, as will be seen, connected in series opposition to one another in the input circuit of the amplifier so that the generator excitation is dependent upon the difference between the voltage derived from the potentiometer and the voltage produced by the tachometer generator.

The torque produced by the motor 5 is therefore dependent upon the difference between the actual speed of the lift cage 1 and a prescribed speed represented by the potentiometer output voltage, which output voltage is varied by the cam 24 so as to represent at all points during the shaft acceleration, retardation and full speed.

In practice, it is found desirable to employ constant acceleration and retardation of the permissible maximum value, so that over the range of the cam corresponding with acceleration the height of the cam and consequent displacement of the potentiometer is such that the potentiometer output voltage is proportional to the square root of the distance from the decking position, that is the position of rest at any floor, and over the retarding range similarly the cam is so shaped that the potentiometer output voltage is proportional to the square root of the distance to said position of rest. Since the same potentiometer and cam follower are employed for both directions of travel, the cam is operative during both directions of movement.

The rectifier 38 is employed in conjunction with a second blocking rectifier 39x, also conveniently of the dry-plate type, and a time delay network comprising a condenser 40 connected by means of a charging resistor 41 with the output of a preset potentiometer 42 connected across the conductors 16 and 18. Connected in parallel with the condenser 40 are normally closed auxiliary contacts BR3 and BRA2 of a pair of contactors, main contacts BR1 and BRA1 of which are included in the armature circuit of the Ward-Leonard system.

The contact BRA1 is arranged to close and open with a time delay, for example of the order of one second, after energisation and de-energisation of the operating coil OCBR (Fig. 2) of said contactor.

A car switch CS is provided in the car 1 for controlling the "up" and "down" movements of the lift as will be described with reference to Figs. 1 and 2.

Figure 2:
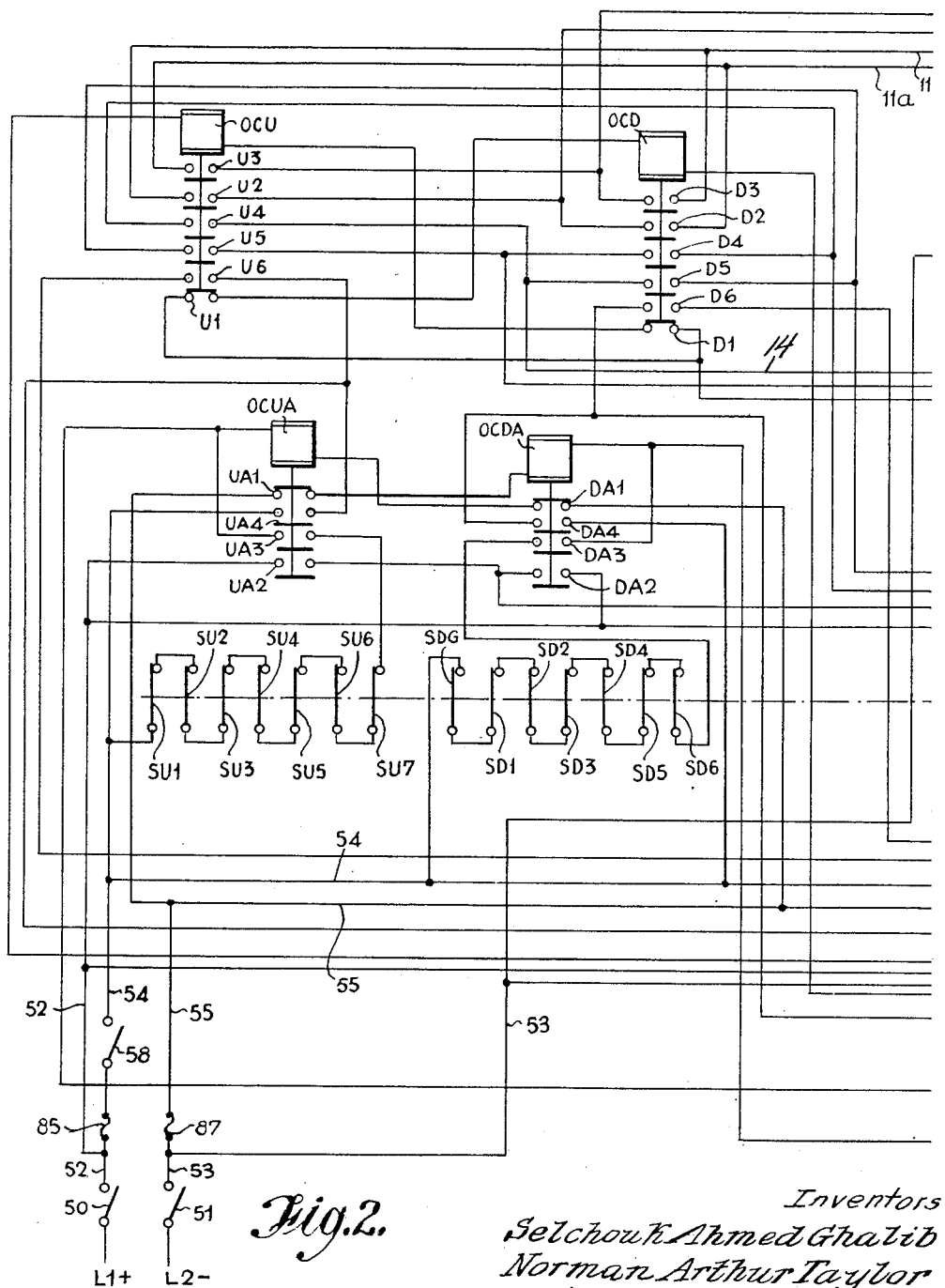

Referring now to Fig. 2, the circuits are supplied from direct current lines L1 and L2 through main switch contacts 50 and 51 supplying conductors 52 and 53 with which the armature and shunt field winding 7a of the motor driving the generator are directly connected, as also is the separately excited field winding 8 of the motor. The holding coil HC is connected also with said conductors by means of parallel contacts UA2 and DA2 of two relays, hereinafter referred to as the "up" auxiliary relay and "down" auxiliary relay respectively. The control circuits are supplied from conductors 54 and 55 connected with the conductors 52 and 53 such as by way of fuses 85 and 87. The conductor 54 preferably includes centrifugally operated contacts 58 mounted on the motor generator set so as to close only when said set is rotating at the normal operating speed.

The car switch CS of Fig. 1 comprises contacts CSU and CSD which are closed when said switch is operated to its "up" and "down" positions, respectively, and are both open when said switch is in a central "off" or neutral position. The contacts CSU are connected in series with the operating coil OCUA, the circuit for said coil including also in series normally closed interlock contacts DA1 operated by the "down" auxiliary relay. Similarly the contacts CSD are connected in the energising circuit for the operating coil OCDA of the "down" auxiliary relay, said circuit including also in series normally closed interlock contacts UA1 of the "up" auxiliary relay. A holding circuit for the coil OCUA is established by closure of normally open contacts UA3 of the "up" auxiliary relay connected in series with floor selector switches SU1 to SU7, which latter are operated by the movement of the lift cage so as each to be opened when the cage approaches within a predetermined distance, for example, five feet, of each floor, these selector switches being otherwise all closed. A holding circuit for the coil OCDA comprises in series normally open interlock contacts DA3 of the "down" auxiliary relay and a further set of floor selector switches SDG, SD1 to SD6. It will be understood that the switches SDG, SD1 to SD6 and the switches SU1 to SU7 are conveniently operated from the shaft 25, such as by the construction hereinafter to be described with reference to Figs. 3 and 4.

The "up" and "down" auxiliary relays include normally open contacts UA3 and UA4 which respectively control the energisation of operating coil OCU of an "up" relay including the contacts U2, U3, U4, and U5 of Fig. 2 and the energisation of operating coil OCD of a "down" relay including contacts D2, D3, D4, and D5. These operating circuits include also limit switches SSU and SSD, located in the shaft for preventing over travel at the ends of the shaft, and include interlock contacts D1 and U1 of the "up" and "down" relays for preventing simultaneous closure of both the relays. These operating circuits are connected in parallel with one another and in series with the operating coil OCBR of the contactor BR1 of Fig. 1 having contacts BR2 which when closed energise the operating coil OCB for releasing the brake and the operating coil OCBRA of the contactor BRA1.

The "up" relay is provided with holding contacts U6 connected in a circuit in parallel with the contacts UA3 and including the stop limit switch FSU of Fig. 1. Similarly the "down" relay operates holding contacts D6 connected in circuit in parallel with the contacts DA4 and including the stop limit switch FSD of Fig. 1.

In the operation of this embodiment of the invention, after the main switch 50, 51 has been closed and when the motor-generator set has run up to speed, the centrifugal switch 58 closes to connect the conductors 54 and 55 with the supply. The equipment is then ready for operation. It will be understood that the main switch remains closed until it is desired to withdraw the lift from service. In order to start the lift the car-switch CS is moved in the appropriate direction to close contacts CSU or CSD. Assuming contacts CSU are closed, operating coil OCUA is energised and closes contacts UA3 to energise operating coils OCU and OCBR. The "up" contactor thus colses its contacts U2 and U3 to connect the generator field winding 9 in the output circuit of the amplifier 12 in the direction to cause upward movement of the lift. The contactor OCBR closes its contacts BR1 to connect the lift motor armature with the generator armature. The lift motor field winding 8 has already been energised by the closure of the main switch. The contactor OCBR also closes its contacts BR2 to energise the brake solenoid OCB and release the brake 10. The "up" contactor also closes contacts U4 and U5 to connect the tachometer-generator 15 with conductors 14 and 16. At this time, the lift car being at a floor, the cam-follower roller is in its lowermost position with contact arm 19 at the lower end of potentiometer 17. The braking relay has also opened its contacts BR3 (Fig. 1) so that the condenser 40 is charged at a rate depending on the voltage derived from potentiometer 42 and the resistance of resistor 41. The condenser voltage is applied to the input circuit of the amplifier at conductors 13 and 16 to produce corresponding output current in the generator field winding 9, so that the motor armature 5 is energised. The lift is thus started and the tachometer-generator produces a voltage in opposition to the condenser voltage whereby the lift speed is regulated in accordance with the condenser voltage. As a result of the movement of the car, the cam dwell 31 moves under the roller 23 to actuate the contact arm 19 progressively upwardly. When the voltage derived on said contact arm exceeds that of the condenser 40, said first voltage is effective to determine the voltage on conductors 16 and 14 and acceleration of the car continues under control of the cam. The blocking rectifiers 38 and 39x provide that the voltage appearing between conductors 16 and 13 is always the greater of the two voltages appearing respectively across condenser 40 and between conductor 16 and contact arm 19. The closure of contacts BR2 has energised the operating coil OCBRA which after a predetermined time interval closes contacts BRA1 in parallel with contact BR1 in the Ward-Leonard circuit and also closes contacts BRA2 which short-circuit the condenser 40, but as above explained the potentiometer 17 is at this time producing a voltage in the amplifier input circuit greater than that of the condenser. When the cam 24 has fully lifted arm 19 the lift is operating at maximum speed. The hold-on coil HC has been initially energised by the closure of contacts UA2 with the result that when the armature 36 is brought into contact with the magnet 37 the arm will be retained in its uppermost position in spite of the decreasing radius of the cam dwell. The lift therefore continues to move at maximum speed, passing all floors until the car switch is centred. In order to stop the car at a floor, the car switch is centred such as when passing the preceding floor in the run, and the contacts CSU are thus opened. A holding circuit for the coil OCUA has, however, been established by means of contacts UA3. This holding circuit is opened at one of the selector switch contacts SU1 . . . SU7, for the floor in question, when the car approaches within a predetermined distance of that floor. Coil OCUA is then de-energised to open contacts UA2 and de-energise coil HC, allowing contact arm 19 to follow the cam dwell and progressively reduce the reference voltage applied to the amplifier input circuit. This de-energisation of coil OCUA opens contacts UA3, but this does not immediately de-energise coil OCU since the latter has established a holding circuit for itself by means of the contacts U6, but when the car reaches the decking level the limit switch FSU is opened by the cam 34 and coil OCU is then de-energised to open contacts U2 and U3 in the generator field circuit and contacts U4 and U5 in the tachometer-generator circuit. Simultaneously, coil OCBR has been de-energised to open contacts BR2 and thereby de-energise brake coil OCB and apply the brake to the sheave 2.

The cam dwells 30 and 31 are so formed that under loading conditions requiring the maximum stopping distance the speed of the car will be reduced to the decking value, for example one-twentieth to one-fiftieth of full speed when the car is nearly at the decking level, so that when the limit switch FSU then operates the application of the brake will bring the car to rest at the floor. The provision of the preset rheostat 17a which remains in circuit when the potentiometer output voltage is zero, enables the decking speed to be adjusted to obtain optimum results.

It will be seen that the cam lever 21 is arranged so that with the roller 23 in its lowermost position, the predetermined decking speed is applied. It will be understood that the cage may overtravel the exact decking levels by small amounts and in order to allow for this and also for the inertia of the cam drum 24 in conjunction with the resilience of the drive wire 28 it is necessary to provide a clearance between the ends of each cam profile, such as 30, and the adjacent cam profile, such as 31. The condenser 40 and associated circuit parts are not essential, but it will be seen that in their absence the car would only move from each floor at the slow decking speed until the cam has been moved to adjust the contact arm 19. Insofar as maximum acceleration would then not be immediately obtained upon starting of the lift the loss of time may be considerable on floor to floor runs over several floors. As hereinbefore explained, however, the provision of the condenser 40 enables the initial acceleration of the car to be given the maximum desired rate irrespective of the necessity for clearance between adjacent cams. It will be clear that smooth acceleration can be obtained continuously from the start by appropriate adjustment of the potentiometer 42 and the time constant of the resistor 41 and the condenser 40.

The operation for downward movement of the car is similar to that above described, the car switch contacts CSD then being closed to energise coil OCDA which in turn energises coil OCD to close contacts D2, D3, and D4, D5 to connect the generator field winding 9 in circuit with the output of the amplifier 12 and the tachometer generator with the conductors 14 and 16 in the opposite directions to those for upward movement. As in the case of upward movement of the car the coil OCBR is energised simultaneously with the coil OCD to release the brake and close contacts BRA1 and BRA2 with a time delay after initiation of car movement. Again the contacts BR1 and BRA1 are closed in turn, and acceleration proceeds initially under control of the charging voltage condenser 40 and then under control of the potentiometer 17 until maximum speed is reached, when again the coil HC is effective to retain the arm 19 in its uppermost position, unless the car switch has been centred when, with contacts CSD open at the predetermined distance from the next floor, one of the selector switch contacts SGD, S$d$1 . . . SD6 opens to de-energise coil OCDA so that the coil OCD is de-energised by opening of limit switch FSD when the car reaches the decking level.

It will be understood that the arrangement described is equally applicable to automatic control systems, the contacts CSU and CSD then being operated by appropriate relays forming part of a call and selector mechanism, which may be of type well known in the art so that further description thereof is unnecessary herein.

With the arrangement described, the "up" and "down" speeds may be identical and independent of load whilst running speed can be achieved at most installations on floor to floor runs.

The cam operated potentiometer may be replaced by other means producing a reference voltage dependent on the position of the cage. In one such modification the cam is replaced by a profiled shielding member of magnetic or conducting material which moves in an air gap between two linked coils one of which is excited from an A. C. supply to induce a voltage in the other coil. The interposition of the shielding member between the two coils alters the magnetic coupling therebetween so as to vary the induced voltage in the desired manner. The alternating voltage induced in the second coil may be rectified and smoothed as necessary before application to the input of the speed controlling amplifier. Other arrangements operating by eddy current or magnetic induction generally may be employed. In another modification, a profiled member is employed as a light screen for varying the amount of light falling on a photoelectric cell or to vary the capacitative coupling between two members. Arrangements of the kinds just above indicated for means determining the reference speed are not subject to mechanical wear.

Figure 3:
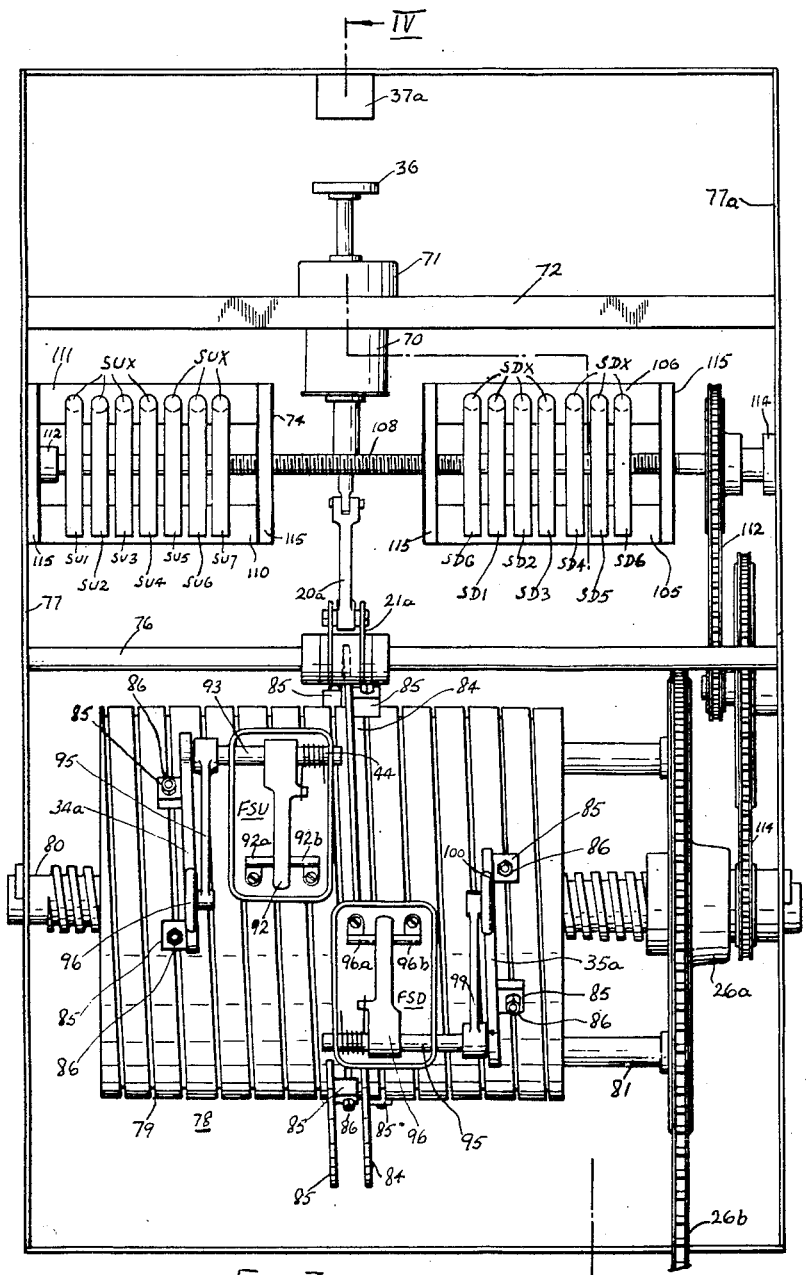
Fig. 3 is a side elevation of a preferred arrangement of cam gear forming part of the system shown in Fig. 1.
Figure 4:
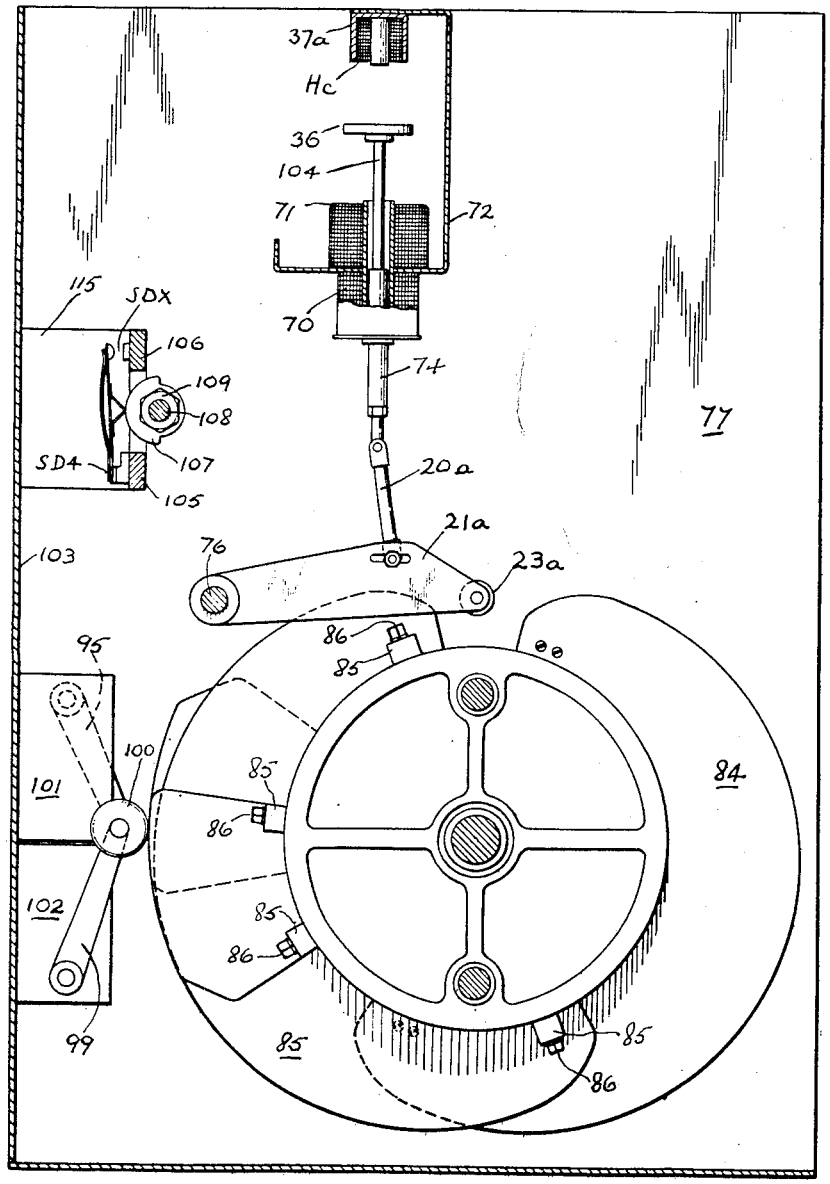
Fig. 4 is a partly fragmentary elevation taken on the line IV—IV of Fig. 3.

One arrangement of this kind is shown in Figs. 3 and 4 which illustrate also a preferred arrangement of the cam shown in Fig. 1. It will be understood that the arrangement shown in Figs. 3 and 4 may be employed for operating the potentiometer shown in Fig. 1 or other means for determining the reference speed.

In Figs. 3 and 4, the two linked coils are shown at 70 and 71 with the interposed magnetic screen 72. The Coil 70 is connected with an alternating current supply whilst the coil 71 is connected in circuit in place of the potentiometer 17 in Fig. 1. A full wave rectifier of the dry-plate type will, for the circuit in Figs. 1 and 2, be included between the coil 71 and the input to the amplifier 12.

A moving plunger 74, conveniently a tubular member with a longitudinal slit for reducing eddy currents is movable within a non-magnetic sleeve 75 on which the coils 70 and 71 are mounted and is connected by means of link 20$a$ with a cam follower lever 21$a$ pivoted at 22$a$ on a cross bar 76 mounted between supporting end walls 77 and 77$a$ of the apparatus. This lever 21$a$ carries a roller 23$a$ co-operating with the cams now to be described. The cam arrangement includes a drum 78 having formed therein a helical T-slot 79, which drum is mounted on and is in screw-thread engagement with a threaded shaft 80 supported between and fixed against rotation in the casing walls 77 and 77$a$. A sprocket wheel 26$a$ is loosely mounted on a plain journal part of the shaft 80 and coupled by a chain partly shown at 26$b$ with the sheave 27 of Fig. 1. The sprocket wheel has secured thereto a pair of rods 81 and 82 extending parallel with the threaded shaft 80 and extending loosely into axial bores in the drum 78. The arrangement is therefore such that rotation of the sprocket wheel 26$a$ will cause both rotational and axial movement of the drum 78, the pitch of the helical slot 79 being the same as that of the thread on the shaft 80. Cam dwells such as 83 and 84 are secured by lugs 85 thereon and bolts 86 received in the slot 79 in the periphery of the drum. These cam dwells are equivalent to the dwells 30 and 31 of Fig. 1 and correspond in number with the number of floor-to-floor runs, although only two of the dwells are shown in Figs. 3 and 4.

It will be clear that with this arrangement the cam dwells may be formed of such lengths to correspond with the various floor-to-floor distances and may be readily attached to the drum 78 and readily adjusted to their correct angular positions on said drum.

In the example illustrated, four revolutions of the sprocket wheel 26$a$ and drum 78 correspond with the complete movement of the car. Four turns of the slot 79 are employed for securing the cam dwells such as 84—85, whilst four more of said turns are employed for carrying a number of cams such as 34$a$ corresponding with cam 34 in Fig. 1 for operating the "up" selector switch FSU. It will be understood that although only one cam 34$a$ is shown in Figs. 3 and 4, there will be a number of such cams equal in number to the number of floors less one. The switch FSU comprises a movable contact arm 92 mounted on a shaft 93 and spring pressed by a spring 94 to bridge fixed contacts 92$a$ and 92$b$. The shaft carries an arm 95 on the outer end of which is pivotally mounted a cam follower roller 96 engageable by the cam 34$a$ to open the limit switch as described with reference to Fig. 1. Similarly, the four turns of the slot of drum 78 at the right-hand end of the drum are employed for supporting the required number of cam dwells such as 35$a$ for operating the "down" selector switch DSU, which is of similar construction to FSU and comprises moving bridging contact 96, fixed contacts 96$a$ and 96$b$, shaft 97 with closing spring 98, and arm 99 and cam follower roller 100. The switches FSU and DSU are mounted in casings 101 and 102 conveniently secured to a front wall shown at 103 of the casing for the apparatus.

The coils 70 and 71 are carried by the screening member 72, which extends across the casing between the walls 77 and 78. The holding magnet 37$a$ is conveniently of E-shape co-operating with a flat disc armature 36$a$.

This armature is mounted on a rod 104 connected with the link 20$a$ carrying also the sleeve 24.

The selector switches SDG, SD1 . . . SD7 comprise moving contact blades secured at their lower ends to an insulating strip 105 and co-operating with respective fixed contacts SDX mounted on an insulating strip 106, the blades being operable by insulating cams 107 which are secured to a threaded shaft 108 by means of locking nuts such as 109, being thus readily adjustable in angular position to cause opening of the contacts at the correct points in the car travel. Similarly, the selector switches SU1 . . . SU7 comprise moving contact blades secured to an insulating strip 110 co-operating with fixed contacts SUX mounted on an insulating strip 111, and operable by cams on the shaft 108, similar to cam 107. The shaft 108 is journalled in bearings 112 and 113 fixed to the walls 77 and 77$a$ and is coupled through the necessary reduction gear with the wall 26$a$, for example by means of a compound chain and sprocket transmission 114.

The strips 105, 106, 110 and 111 are separated by washers 115 from the wall 103 of the casing.

What we claim is:

1. An elevator control system comprising a variable speed electric motor for raising and lowering the cage of the elevator, amplifying means for varying the energisation of said motor in accordance with the input to said amplifying means, input control means for said amplifying means including speed-responsive means coupled with the motor for producing a signal dependent on the speed of the motor and position-responsive means coupled with the cage for producing a reference quantity varying progressively in dependence on the distance of the cage from each of a plurality of decking positions, said reference quantity being reduced to a small value at said positions, starting and stopping control means for the elevator and means responsive to the operation of said stopping and starting control means to control the amplifying means differentially by said speed-responsive means and said reference quantity, said control means including means responsive to operation of said control means to start the lift by producing progressive initial variation of the reference quantity applied to the input of the amplifying means independently of movement of the cage to thereby effect initial acceleration of the cage followed by further progressive acceleration of the cage under control of said position responsive means in predetermined relation to the distance of the cage from the starting position and to stop the elevator by causing progressive retardation of the motor by said position responsive means in predetermined relation to the distance of the cage from the required stopping position, and means for maintaining the speed of the motor in response to the operation of the control means for passing a decking position.

2. An elevator control system comprising a variable speed electric motor for raising and lowering the cage of the elevator, amplifying means for varying the energisation of said motor in accordance with the input to said amplifying means, input control means for said amplifying means including speed responsive means coupled with the motor for producing a signal dependent on the speed of the motor and position-responsive means coupled with the cage for producing a reference quantity varying progressively in dependence on the distance of the cage from each of a plurality of decking positions, said reference quantity being reduced to a small value at said positions, starting and stopping control means for the elevator and means responsive to the operation of said starting and stopping control means to control the amplifying means differentially by said speed-responsive means and said reference quantity, said control means including means responsive to operation of said control means to start the lift by producing progressive initial variation of the reference quantity applied to the input of the amplifying means independently of movement of the cage thereby to effect initial acceleration of the cage followed by further progressive acceleration of the cage under control of said position responsive means in predetermined relation to the distance of the cage from the starting position and to stop the elevator by causing progressive retardation of the motor by said position-responsive means in predetermined relation to the distance of the cage from the required stopping position, means for maintaining the speed of the motor in response to the operation of the control means for passing a decking position, braking means for the cage and means responsive to the position of the cage for applying said braking means when the cage reaches a required decking position.

3. An elevator control system comprising a variable speed electric motor for raising and lowering the cage of the elevator, amplifying means for varying the energisation of said motor in accordance with the input to said amplifying means, input control means for said amplifying means including speed responsive means coupled with the motor for producing a signal dependent on the speed of the motor and position-responsive means coupled with the cage for producing a first reference quantity varying progressively in dependence on the distance of the cage from each of a plurality of decking positions, said reference quantity being reduced to a small value adjacent said positions, time delay means producing a second speed reference quantity varying in a predetermined manner with time, starting and stopping control means for the elevator and means responsive to the operation of said stopping and starting control means to start the lift by applying said second reference quantity and the output of said speed responsive means to control the amplifying means differentially whereby to cause initial acceleration of the motor in a predetermined manner with time, and thereafter to control the amplifying means differentially by said position responsive means and said speed responsive means and thereby to cause progressive further acceleration of the motor by said position responsive means in predetermined relation to the distance of the cage from the starting position and to stop the elevator by causing progressive retardation of the motor by said position responsive means in predetermined relation to the distance of the cage from the required stopping position, and means for maintaining the speed of the motor in response to the operation of the control means for passing a decking position.

4. An elevator control system as defined in claim 3, in which the time delay means comprises a resistance-capacity time delay electric circuit.

5. An elevator control system comprising a variable speed electric motor for raising and lowering the cage of the elevator, amplifying means of varying the energisation of said motor in accordance with the input to said amplifying means, input control means for said amplifying means including speed responsive means coupled with the motor for producing a signal dependent on the speed of the motor and a current varying electrical device having an adjusting member cooperating with cam means coupled with the cage whereby to produce a reference quantity varying progressively in dependence on the distance of the cage from each of a plurality of decking positions, said reference quantity being reduced to a small value at said positions, starting and stopping control means for the elevator and means responsive to the operation of said starting and stopping control means to control the amplifying means differentially by said speed responsive means and said reference quantity, said control means including means responsive to operation of said control means to start the lift by producing progressive initial variation of the reference quantity applied to the input of the amplifying means independently of movement of the cage to thereby effect initial acceleration of the cage followed by further progressive acceleration of the cage under control of said current varrying means in predetermined relation to the distance of the cage from the starting position and to stop the elevator by causing progressive retardation of the motor by said current varying means in predetermined relation to the distance of the cage from the required stopping position, and means for maintaining the speed of the motor in response to the operation of the control means for passing a decking position.

6. An elevator control system as claimed in claim 5, in which the current varying electrical device comprises inductive means having primary and secondary windings and a movable magnetic member variably linking said windings together and co-operating with the cam means, said windings being connected in an alternating current circuit in the input of the amplifying means.

7. An elevator control system as defined in claim 5, in which the adjusting member of the current varying electrical device is provided with retaining means responsive to operation of the starting and stopping control means for passing decking positions for retaining said adjusting member in the maximum speed position, said retaining means being releasable jointly in response to operation of said starting and stopping control means to stop the lift and in dependence on the position of the cage, whereby said retaining means maintain the reference quantity and the speed of the motor in response to said operation of said control means for passing a decking position.

8. An elevator control system as defined in claim 2, in which the braking means for the cage are provided with an electrical releasing circuit, said releasing circuit and a circuit for removing power from the electrical circuit including stopping limit switches operable by the movement of the cage at each decking position and including the stopping control means, said switches and the speed and position responsive means being located in the elevator machine room.

9. An elevator control system as defined in claim 1, in which the position-responsive means include an adjusting member operable by movement of the cage for producing the reference quantity varying progressively in dependence on the distance of the cage from each of a plurality of decking positions, in combination with retaining means responsive to operation of the starting and stopping control means for passing a decking position for retaining said adjusting member in the maximum position, said retaining means being releasable jointly in response to operation of said starting and stopping control means to stop the lift and in dependence on the position of the cage, whereby said retaining means maintain the reference quantity and the speed of the motor in response to said operation of said control means for passing a decking position.

10. An elevator control system as defined in claim 3, in which the time delay means comprise a resistance-capacity time delay electric circuit connected in an input circuit of the amplifying means in combination with the position responsive means for producing the first reference quantity, and means selectively responsive to the greater of said first and second reference quantities.

11. An elevator control system as defined in claim 5, in which the cam means comprise a rotary member coupled with the cage and including a number of dwells or profiles disposed in helical formation, screw thread means being arranged to effect relative axial movement between the cam and the cam follower simultaneously with the rotation of the cam whereby a plurality of revolutions of said drum correspond with the complete range of elevator movement.

12. An elevator control system as defined in claim 5, in which the cam means comprise a rotary drum coupled with the cage and provided with a helical slot, a number of cam profiles angularly adjustably mounted on said drum by securing means located in said slot and disposed in helical formation, and screw thread means for effecting relative axial movement between the cam and the cam follower simultaneously with the rotation of the cam whereby a plurality of revolutions of said drum correspond with the complete range of elevator movement.

13. An elevator control system comprising a variable speed electric motor for raising and lowering the cage of the elevator, electrical amplifying means for varying the energisation of said motor, an input circuit arrangement for said amplifying means including speed responsive means coupled with the motor for producing an electrical signal dependent on the speed of the motor and a current varying electrical device having an adjusting member co-operating with cam means coupled with the cage whereby to produce a first electrical reference quantity varying progressively in dependence on the distance of the cage from each of plurality of decking positions, said reference quantity being reduced to a small value adjacent said positions, a resistance capacity time delay combination for producing a second reference quantity varying in predetermined manner with time, means selectively responsive to the greater of said first and second reference quantities, starting and stopping control means for the elevator and means responsive to operation of said control means to start the elevator to apply said first and second reference quantities and said speed dependent signal in the input of the amplifying means so as initially to control the energisation of the motor differentially in accordance with said second reference quantity and the speed of the motor whereby to control the acceleration of the cage from rest in a predetermined manner with respect to time, and subsequently to effect further acceleration of the cage differentially under control of said second reference quantity and said speed dependent signal in predetermined relation to the distance of the cage from the starting position and to stop the elevator by casting progressive retardation of the motor by said first reference quantity and said speed dependent signal acting differentially in the input circuit of the amplifying means whereby said retardation is effected progressively in predetermined relation to the distance of the cage from the required stopping position, and electromagnetic means for retaining said adjusting member of the speed responsive means in the maximum position, and energising circuits for said electromagnetic retaining means including contacts of said starting and stopping control means and stop switches coupled with the cage for operation at the decking positions of the cage, whereby said retaining means maintain the reference quantity and the speed of the motor in response to the operation of said control means for passing a decking position.

14. An elevator control system as defined in claim 1, which the reference quantity produced by the position responsive means in dependence on the square root of the distance of the cage from each of a plurality of decking positions, to cause substantially uniform acceleration and retardation of the motor.

References Cited in the file of this patent

UNITED STATES PATENTS

| | | |
|---|---|---|
| 2,557,179 | Fish et al. | June 19, 1951 |
| 2,641,337 | Lund | June 9, 1953 |